United States Patent
Lewis et al.

(10) Patent No.: US 11,477,142 B1
(45) Date of Patent: Oct. 18, 2022

(54) QUESTION SUGGESTION AND AGENT TRANSFER TO ADVANCE A CUSTOMER SUPPORT CONVERSATION

(71) Applicant: International Business Machines Corporation, Armonk, NY (US)

(72) Inventors: Jacob Lewis, New York City, NY (US); Ruchi Asthana, New York, NY (US); Jennifer A. Mallette, Vienna, VA (US); Steven Ware Jones, Astoria, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/457,933

(22) Filed: Dec. 7, 2021

(51) Int. Cl.
*H04L 51/02* (2022.01)
*G06F 40/30* (2020.01)
*H04L 51/046* (2022.01)
*G06Q 30/00* (2012.01)

(52) U.S. Cl.
CPC .............. *H04L 51/02* (2013.01); *G06F 40/30* (2020.01); *G06Q 30/016* (2013.01); *H04L 51/046* (2013.01)

(58) Field of Classification Search
CPC ....... H04L 51/02; H04L 51/046; G06F 40/30; G06Q 30/016
See application file for complete search history.

(56) References Cited

U.S. PATENT DOCUMENTS

| 9,092,801 | B2 | 7/2015 | Chang |
|---|---|---|---|
| 9,647,968 | B2 | 5/2017 | Smullen |
| 9,866,693 | B2 | 1/2018 | Tamblyn |
| 10,171,662 | B1 | 1/2019 | Zhou |
| 10,592,613 | B2 | 3/2020 | Gupta |
| 10,999,434 | B1 * | 5/2021 | Andar ............... G06N 5/04 |

(Continued)

FOREIGN PATENT DOCUMENTS

WO 2019027992 A1 2/2019

OTHER PUBLICATIONS

Acuvate, "Bots to Human-Hand off", Bot Core by Acuvate, Accessed on Apr. 8, 2021, 8 Pages.

(Continued)

*Primary Examiner* — Sargon N Nano
(74) *Attorney, Agent, or Firm* — Stephanie L. Carusillo

(57) ABSTRACT

In an approach for identifying when transferring a real-time conversation on a chatbot application to a customer support agent would be more valuable than outputting suggested queries, a processor classifies a query inputted into a real-time conversation as an intention. A processor predicts a set of next intentions of the user. A processor filters out one or more intentions from the set of next intentions of the user that do not further the real-time conversation. A processor generates a set of suggested queries the user can ask to further the real-time conversation from the subset of next intentions. A processor builds a suggestion evaluation contextual bandit model that determines whether the real-time conversation will be resolved successfully if transferred to a customer support agent. A processor trains the suggestion evaluation contextual bandit model against a set of annotated historical interactions. A processor outputs a response recommendation.

20 Claims, 8 Drawing Sheets

(56) References Cited

U.S. PATENT DOCUMENTS

| | | | | |
|---|---|---|---|---|
| 11,170,026 | B1* | 11/2021 | Brown | G06F 16/93 |
| 11,170,175 | B1* | 11/2021 | Kohli | G06F 40/284 |
| 2013/0080362 | A1 | 3/2013 | Chang | |
| 2014/0044243 | A1 | 2/2014 | Monegan | |
| 2014/0317120 | A1 | 10/2014 | Ghose | |
| 2015/0120357 | A1* | 4/2015 | Tuchman | G06Q 10/063114 705/7.15 |
| 2016/0078456 | A1 | 3/2016 | Chakraborty | |
| 2016/0358240 | A1* | 12/2016 | Redfern | G06Q 30/0619 |
| 2017/0094058 | A1 | 3/2017 | Piaggio | |
| 2017/0351962 | A1 | 12/2017 | Appel | |
| 2019/0052584 | A1 | 2/2019 | Barve | |
| 2020/0125586 | A1* | 4/2020 | Rezaeian | G06N 7/005 |
| 2020/0168231 | A1* | 5/2020 | Alagianambi | G06F 40/30 |
| 2020/0219494 | A1* | 7/2020 | Dhoolia | G10L 15/16 |
| 2020/0320365 | A1* | 10/2020 | Arat | G06F 8/38 |
| 2021/0081442 | A1* | 3/2021 | Ganu | G06F 16/3329 |
| 2021/0097110 | A1 | 4/2021 | Asthana | |
| 2021/0272127 | A1* | 9/2021 | Mahalle | H04M 3/5141 |
| 2022/0036277 | A1* | 2/2022 | Ranganathan | G10L 25/63 |

OTHER PUBLICATIONS

Flow. AI, "Chatbot Handoff—How to nail the bot to human handoff", Accessed on Apr. 8, 2021, 7 Pages.

IBM Appendix P, "List of patent and patent applications treated as related", Filed Herewith, 2 pages.

Mamgain, Devashish, "Chatbot Human Handoff: Seamless Human takeover", Kommunicate, Feb. 11, 2019, 14 Pages.

Ricciardelli et al., "Self-improving Chatbots based on Reinforcement Learning", 4th Multidisciplinary Conference on Reinforcement Learning and Decision Making, May 2019, 6 Pages.

Shrivastava, Parth, "Chatbot to Human Handoff: Best Practices for Human Takeover in a Hybrid Solution", Chatbots Life, Medium, Feb. 3, 2020, 18 Pages.

Yang et al., "Neural Matching Models for Question Retrieval and Next Question Prediction in Conversation", SIGIR 2017 Workshop on Neural Information Retrieval (Neu-IR'17), Shinjuku, Tokyo, Japan, Aug. 7-11, 2017, 7 Pages.

* cited by examiner

QUESTION SUGGESTION AND AGENT TRANSFER TO ADVANCE A CUSTOMER SUPPORT CONVERSATION

BACKGROUND OF THE INVENTION

The present invention relates generally to the field of data processing, and more particularly to a question suggestion and agent transfer method to advance a customer support conversation.

A customer support conversation refers to a real-time communication between a customer and an artificial intelligence bot (i.e., a chatbot) or a customer support agent via multiple channels of communication (e.g., in person, over the phone, through an email, or on a live chat). Typically, when a customer support conversation occurs on a live chat, the live chat is found in a pop-up dialogue box built into the website of the company offering the customer service. Through the pop-up dialogue box, the customer can interact with the chatbot or the customer support agent about topics including, but not limited to, the features of a product or service, the selection of a product or service, or a technical issue. Using a chatbot to support the customer support conversation permits the company to offer customer support and gives the customer the opportunity to resolve a simple issue at all hours of the day.

A chatbot is a computer program designed to stimulate an intelligent conversation with a customer, via auditory or textual methods. The chatbot can interpret a customer's queries and/or requests and generate one or more responses. The chatbot will generate a response based on keyword identification. That means, the chatbot will scan for key words within an incoming message and select a reply with the most matching key words, or the most similar word pattern, from a textual database. In one or more embodiments, the chatbot will generate a response using a natural language processing algorithm. That means, the chatbot will use natural language processing to translate the natural language input to generate responses based on machine learning constructs, such as supervised and/or unsupervised learning methods. Using these methods, a chatbot can interpret the natural language input and extract open and/or closed questions, sentiment, conference, ambiguity, text structures, summarizations, and other natural language processing tasks from text, speech, and/or images. Chatbots learn from behavior and imitate it in chatbot conversations with the customer. Building complicated guided paths that mimic a customer support agent's behavior is very cumbersome, and these paths make the bot feel limited to either a choose your own adventure narrative or a dynamic back-and-forth.

Using a customer support agent to support the customer support conversation, on the other hand, allows for an expedited time for issue resolution and an increase in customer satisfaction. The customer support agent is an asset in a sales conversation about a product or service because the customer support agent can ask the customer specific questions that can move the sales conversations further along the buyer journey path—i.e., towards a successful resolution. Success, in this case, can be defined in many ways, including, but not limited to, the purchase of a product, the enlistment in a trial of a service, and the resolution of a technical issue.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

Aspects of an embodiment of the present invention disclose a method, computer program product, and computer system for identifying when transferring a real-time conversation on a chatbot application to a customer support agent would be more valuable than outputting suggested questions. Responsive to a user inputting a query into a real-time conversation on a chatbot application through a user interface of a user computing device, a processor classifies the query as an intention of the user utilizing an intent classifier and predictor engine. A processor predicts a set of next intentions of the user utilizing the intent classifier and predictor engine, wherein the set of next intentions of the user are predicted based on a pattern recognized, in a plurality of queries previously received, by the intent classifier and predictor engine. A processor trains a question suggestion engine to filter out one or more intentions from the set of next intentions of the user that do not further the real-time conversation on the chatbot application, wherein a subset of next intentions remaining provide a basis for the question suggestion engine to generate a set of suggested queries that the user can ask to further the real-time conversation on the chatbot application. A processor generates the set of suggested queries using the question suggestion engine. A processor builds a suggestion evaluation contextual bandit model that determines whether the real-time conversation on the chatbot application will be resolved successfully if transferred to a customer support agent. A processor trains the suggestion evaluation contextual bandit model against a set of annotated historical interactions to evaluate a response by a chatbot to the query based on an outcome of the set of historical interactions. A processor outputs a response recommendation into the real-time conversation on the chatbot application through the user interface of the user computing device, wherein the response recommendation includes the set of suggested queries.

In some aspects of an embodiment of the present invention, subsequent to training the suggestion evaluation contextual bandit model, a processor applies the suggestion evaluation contextual bandit model to the query input by the user by comparing a state of the user, the response to the query by the chatbot, and a transfer to the customer support agent to form the response recommendation.

In some aspects of an embodiment of the present invention, a processor prepares the set of data for the suggestion evaluation contextual bandit model. A processor gathers a plurality of historical transcripts of one or more real-time conversations on the chatbot application that were transferred from the chatbot to the customer support agent from a database. A processor allocates one or more intentions from the set of next intentions to one or more buyer stages of the real-time conversation on the chatbot application. A processor annotates the plurality of historical transcripts of the one or more real-time conversations on the chatbot application that were transferred from the chatbot to the customer support agent as a success or as a failure.

In some aspects of an embodiment of the present invention, a respective real-time conversation of the plurality of historical transcripts of the one or more real-time conversations on the chatbot application that was transferred from the chatbot to the customer support agent is a success when the real-time conversation on the chatbot application ends with a successful resolution and a failure when the real-time conversation on the chatbot application ends with an unsuccessful resolution.

In some aspects of an embodiment of the present invention, a processor defines a plurality of states to be used to simplify the real-time conversation on the chatbot application into a small tractable number of states. A processor enables the customer support agent to select an action regarding one or more options to present to the user in the real-time conversation on the chatbot application from a set of actions. A processor defines a plurality of rewards based on what the user has previously done.

In some aspects of an embodiment of the present invention, the plurality of states includes a first state marking a start of the real-time conversation; a second state marking an end of the real-time conversation; a no previous context state marking a second start of a second user query during the real-time conversation; and a third state marking a third start of a buyer stage and whether a previous buyer stage was more advanced, less advanced, or the same as the buyer stage.

In some aspects of an embodiment of the present invention, the buyer stage is selected from the group consisting of: not interested, try, learn, late-learn, and buy.

In some aspects of an embodiment of the present invention, the set of actions is either (i) to show a set comprised of a top three predicted next intentions or (ii) to show a second set of a top two predicted next intentions before transferring to the customer support agent.

In some aspects of an embodiment of the present invention, the plurality of rewards defined are 1 if the user clicks on one or more suggested questions; 10 if the user is transferred to the customer support agent and the real-time conversation on the chatbot application is labeled as successful; and −10 if the user is transferred to the customer support agent but the real-time conversation on the chatbot application is labeled as unsuccessful.

In some aspects of an embodiment of the present invention, a processor gathers one or more real-time conversations on the chatbot application transferred from the chatbot to the customer support agent and labeled with the outcome. A processor converts the outcome to a reward. A processor performs a random dropout on the real-time conversation on the chatbot application in order to change a history of the real-time conversation on the chatbot application and randomize the real-time conversation on the chatbot application before the user is transferred to the customer support agent.

In some aspects of an embodiment of the present invention, if the outcome is positive, the reward is either 10 for suggesting a transfer to the customer support agent; 1 if the next intention appears in the real-time conversation on the chatbot application; or 0.

In some aspects of an embodiment of the present invention, if the outcome is negative, the reward is −10 for suggesting transfer to the customer support agent; 1 if the next intention appears in the real-time conversation; or 0.

These and other features and advantages of the present invention will be described in, or will become apparent to those of ordinary skill in the art in view of, the following detailed description of the example embodiments of the present invention.

DETAILED DESCRIPTION

Figure 1:
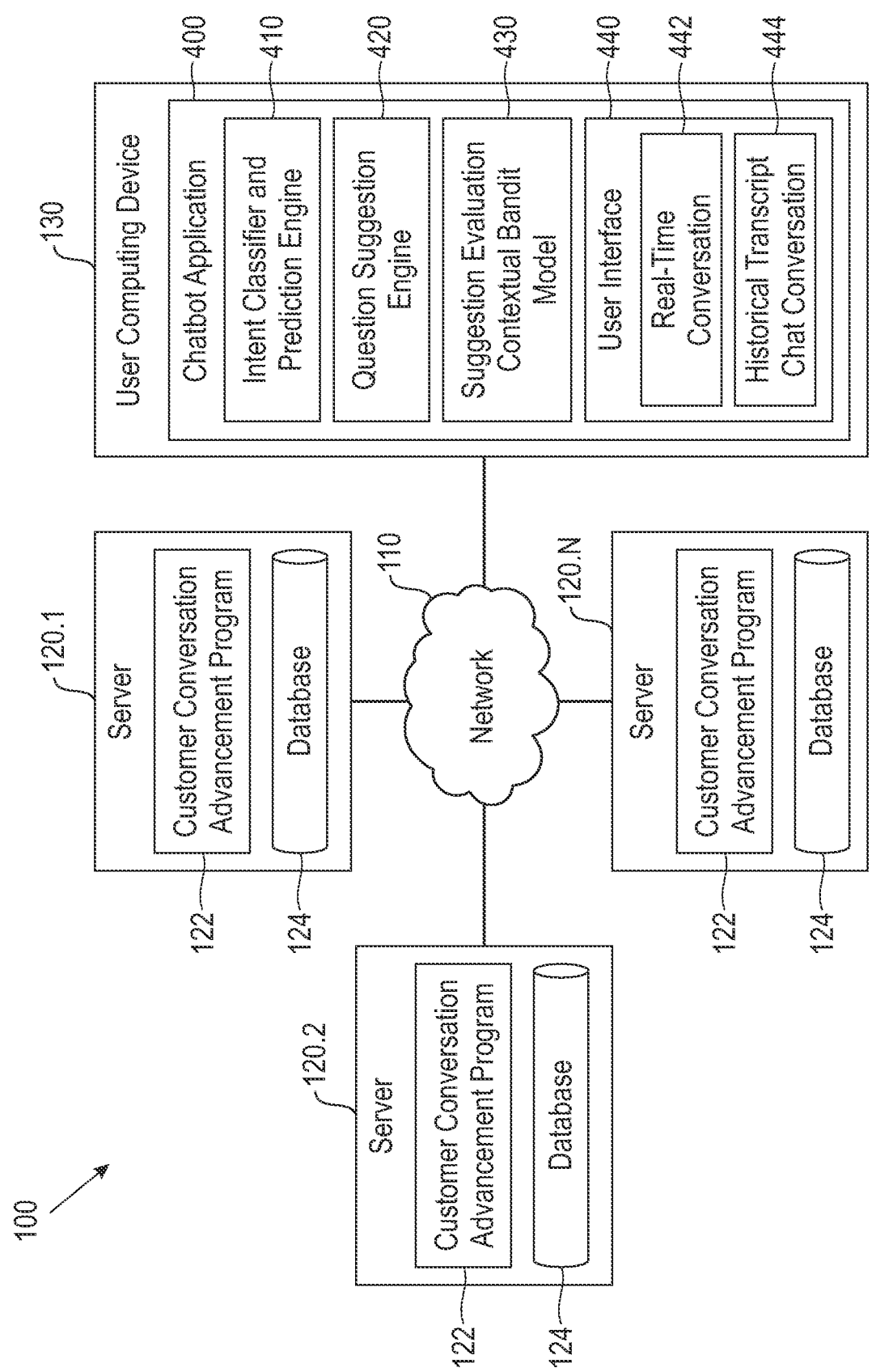
FIG. 1 is a functional block diagram illustrating a distributed data processing environment, in accordance with an embodiment of the present invention.

Embodiments of the present invention recognize that a method for training and applying a dynamic back and forth chatbot model that can suggest specific, personalized questions to push the customer support conversation forward currently exists. Embodiments of the present invention, however, recognize that this method does not work in all situations. Embodiments of the present invention recognize that, in certain situations, transferring the customer support conversation from the chatbot to a customer support agent can be beneficial because the customer support agent can assist the customer in a way that would push the customer along the buyer journey path—urging the customer to try or buy the product. Therefore, embodiments of the present invention recognize the need for a system and method to recognize when transferring a customer support conversation from a chatbot to a customer support agent would be more valuable than suggesting questions to the customer.

Embodiments of the present invention provide a system and method to analyze a plurality of historical transcripts of real-time conversations on a chatbot application that were transferred from a chatbot to a customer support agent; to label the act of transferring in each of the real-time conversations on the chatbot application as a success or as a failure; and to calculate the likelihood that suggesting questions to the customer will result in a success and the likelihood that transferring the current real-time conversation to a customer support agent will result in a success using a Suggestion Evaluation Contextual Bandit Model. Embodiments of the present invention provide a system and method to add "Transfer to Customer Support Agent" as a suggestion when the likelihood of transferring the current customer support conversation to a customer support agent will result in a success is greater.

Embodiments of the present invention provide a system and method that is a technical improvement over technologies found in the marketplace today. Embodiments of the present invention provide a system and method that improves the traditional Contextual Bandit Model by simplifying real-time conversations on a chatbot application into a small tractable number of states with the following properties: change from previous buyer state, buyer state of current utterance, and vector of predicted next intentions. Embodiments of the present invention provide a system and method that improves the traditional Contextual Bandit Model by assuming independence between the probability of a customer electing to transfer to a customer support agent and the probability of a successful human conversation. Embodiments of the present invention provide a system and method that, with these modifications, is able to tractably evaluate the expected reward of each potential action to maximize the value of the conversation.

Implementation of embodiments of the present invention may take a variety of forms, and exemplary implementation details are discussed subsequently with reference to the Figures.

FIG. 1 is a functional block diagram illustrating a distributed data processing environment, generally designated 100, in accordance with an embodiment of the present invention. In the depicted embodiment, distributed data processing environment 100 includes servers $120_1$, $120_2$ through $120_N$ and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server $120_1$, $120_2$ through $120_N$, user computing device 130, and other computing devices (not shown) within distributed data processing environment 100.

Servers $120_1$ through $120_N$ operate to run customer conversation advancement program 122 and to send and/or store data in database 124, wherein N represents any positive integer and hereinafter they are collectively referred to as servers 120 or a server 120. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, servers 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 2.

Customer conversation advancement program 122 operates to analyze a plurality of historical transcripts of real-time conversations on a chatbot application that were transferred from a chatbot to a customer support agent; to label the act of transferring in each of the real-time conversations on the chatbot application as a success or as a failure; and to calculate the likelihood suggesting questions to the customer will result in a success and the likelihood transferring the current real-time conversation to a customer support agent will result in a success using a Suggestion Evaluation Contextual Bandit Model. In the depicted embodiment, customer conversation advancement program 122 is a standalone program. In another embodiment, customer conversation advancement program 122 may be integrated into another software product, such as an e-commerce software (i.e., a software that enables the process of buying and selling product over the internet) or a live chat software (i.e., a software that provides a customer with a platform where the customer can seek help regarding a product or a service sold by a company). In the depicted embodiment, customer conversation advancement program 122 resides on server 120. In another embodiment, customer conversation advancement program 122 may reside on another server (not shown), provided that customer conversation advancement program 122 has access to network 110. The overall operational steps of customer conversation advancement program 122 are depicted and described in further detail with respect to FIG. 3. The components of chatbot application 400 are depicted and described in further detail in FIG. 4. A Markov type model 500 is depicted and described in further detail in FIG. 5. The operational steps of intention-based question suggestion component 600 of customer conversation advancement program 122 used to advance a transaction conducted via chatbot application 400 is described in further detail in FIG. 6A and FIG. 6B. Example 700 of a real-time conversation within chatbot application 400 is depicted and described in further detail in FIG. 7.

Database 124 operates as a repository for data received, used, and/or generated by customer conversation advancement program 122. A database is an organized collection of data. Data includes, but is not limited to, information about user preferences (e.g., general user system settings such as alert notifications for user computing device 130); information about alert notification preferences; and any other data received, used, and/or generated by customer conversation advancement program 122. Database 124 can be implemented with any type of device capable of storing data and configuration files that can be accessed and utilized by server 120, such as a hard disk drive, a database server, or a flash memory. In an embodiment, database 124 is accessed by customer conversation advancement program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that customer conversation advancement program 122 has access to database 124.

User computing device 130 operates to run user interface 440 through which user 435 can interact with customer conversation advancement program 122 on server 120. In an embodiment, user computing device 130 is a device that performs programmable instructions. For example, user computing device 130 may be an electronic device, such as laptop computer, a tablet computer, a netbook computer, a personal computer, a desktop computer, a smart phone, or any programmable electronic device capable of running user interface 440 and of communicating (i.e., sending and receiving data) with customer conversation advancement program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of chatbot application 400, which contains intent classifier and prediction engine 410, question suggestion engine 420, suggestion evaluation contextual bandit model 430, and user interface 440, which contains real-time conversation 442 and historical transcripts of real-time conversations 444.

User interface 440 operates as a local user interface between customer conversation advancement program 122 on server 120 and user 435 of user computing device 130. In some embodiments, user interface 440 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from customer conversation advancement program 122 to user 435 via network 110. User interface 440 can also display or present alerts including information (such as graphics, text, and/or sound) sent from customer conversation advancement program 122 to user 435 via network 110. In an embodiment, user interface 440 is capable of sending and receiving data (i.e., to and from customer conversation advancement program 122 via network 110, respectively). Through user interface 440, user 435 can set user preferences and alert notification preferences, input query 405 into real-time conversation 442 on chatbot application 400, and receive response recommendation 438.

A user preference is a setting that can be customized for a particular user. A set of default user preferences are assigned to user 435 of customer conversation advancement program 122. A user preference editor can be used to update values to change the default user preferences. User preferences that can be customized include, but are not limited to, general user system settings, specific user profile settings for customer conversation advancement program 122, alert notification settings, and machine-learned data collection/storage settings.

Specific user profile settings include, but are not limited to, a tailored alert notification. Customer conversation advancement program 122 delivers the amount of contextual content required by user 435, based on user 435's personal preferences. The amount of contextual content required by user 435 varies, but may be an unabridged content comparison (i.e., the complete text that has not been cut or shortened in any form or manner), an abridged content comparison (i.e., a piece of content that is shortened but does not lose the central points), a summary content comparison (i.e., a paragraph style summary that conveys all of the points in summary format), or an executive summary of content comparison (i.e., a very short summary about 3 to 5 sentences in length).

Machine-learned data is user 435's personalized corpus of data. Machine-learned data includes, but is not limited to, data regarding past results of iterations of customer conversation advancement program 122 and user 435's previous responses to an alert notification sent by customer conversation advancement program 122. Customer conversation advancement program 122 self-learns by tracking user 435's activity, by classifying and retaining new content, and by improving with each iteration of customer conversation advancement program 122. Customer conversation advancement program 122 tracks which chat transcripts or which portions of chat transcripts are repeatedly generated. By tracking such data, customer conversation advancement program 122 can learn which chat transcripts are relevant to user 435 (e.g., repeatedly generating a chat transcript or a portion of a chat transcript) and which chat transcripts are irrelevant (e.g., repeatedly removing a chat transcript or a portion of a chat transcript). By classifying and retaining such data, customer conversation advancement program 122 can automatically filter out certain chat transcripts over time and ensure that repetitive information is not generated and sent to user 435. Instead, customer conversation advancement program 122 bypasses the repetitive information and locates new information for user 435. Customer conversation advancement program 122 can also recommend suggestions (e.g., on the likelihood of the generation of certain chat transcripts) to user 435 so that user 435 can manually filter out certain chat transcripts.

Figure 2:
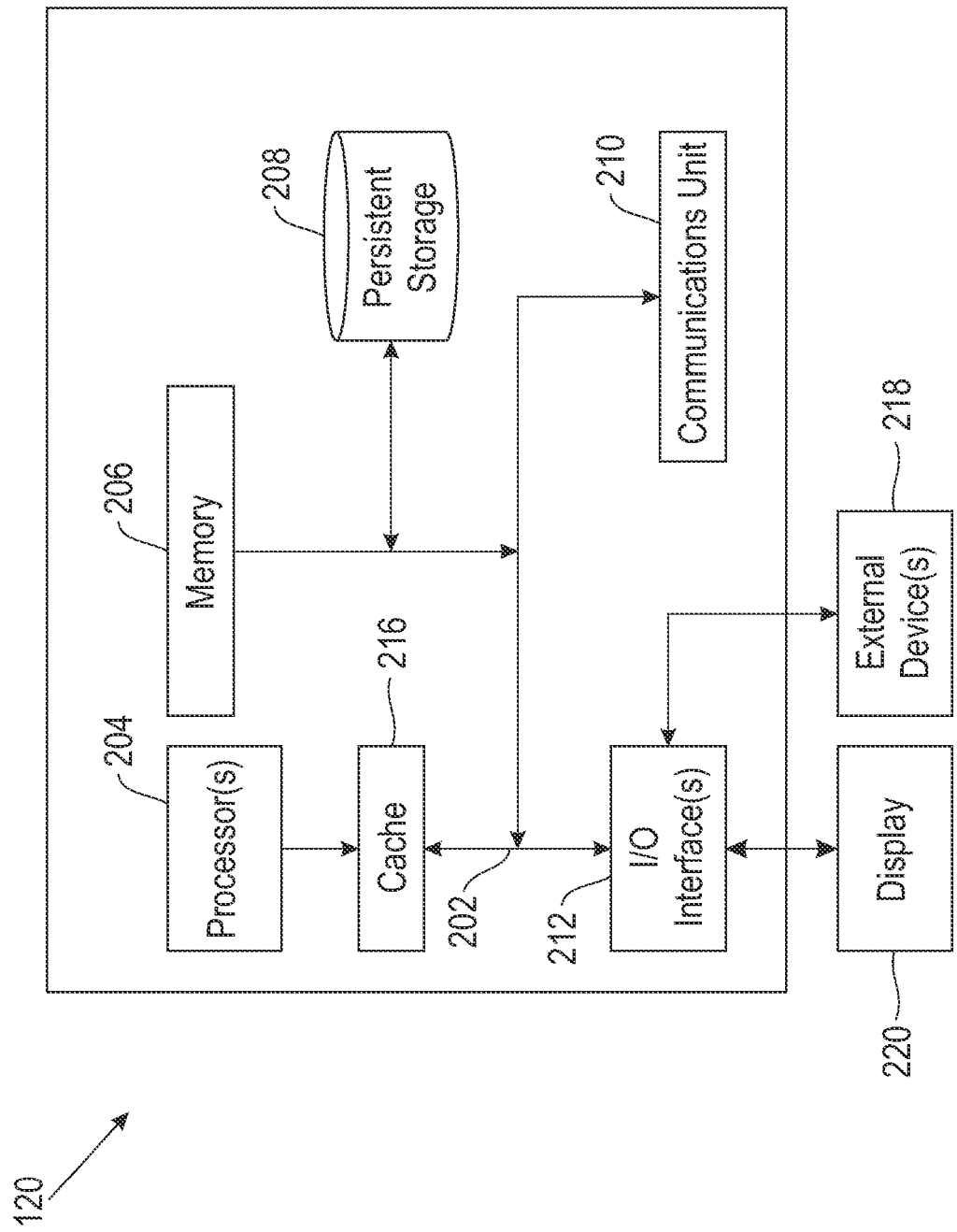
FIG. 2 is a block diagram illustrating the components of a server within the distributed data processing environment of FIG. 1, in accordance with an embodiment of the present invention.

FIG. 2 is a block diagram illustrating the components of server 120 within distributed data processing environment 100 of FIG. 1, in accordance with an embodiment of the present invention. It should be appreciated that FIG. 2 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Server 120 includes processor(s) 204, memory 206, cache 216, communications fabric 202, persistent storage 208, input/output (I/O) interface(s) 212, and communications unit 210. Communications fabric 202 provides communications between memory 206, cache 216, persistent storage 208, input/output (I/O) interface(s) 212, and communications unit 210. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses or a cross switch. Memory 206 and persistent storage 208 are computer readable storage media. In this embodiment, memory 206 includes random access memory (RAM). In general, memory 206 can include any suitable volatile or non-volatile computer readable storage media. Cache 216 is a fast memory that enhances the performance of processor(s) 204 by holding recently accessed data, and data near accessed data, from memory 206.

Program instructions and data (e.g., software and data) used to practice embodiments of the present invention may be stored in persistent storage 208 and in memory 206 for execution by one or more of the respective processor(s) 204 via cache 216. In an embodiment, persistent storage 208 includes a magnetic hard disk drive. Alternatively, or in addition to a magnetic hard disk drive, persistent storage 208 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 208 may also be removable. For example, a removable hard drive may be used for persistent storage 208. Other examples include optical and magnetic disks, thumb drives, and smart cards that are inserted into a drive for transfer onto another computer readable storage medium that is also part of persistent storage 208. Software and data can be stored in persistent storage 208 for access and/or execution by one or more of the respective processor(s) 204 via cache 216. With respect to user computing device 130, software and data includes user interface 440. With respect to server 120, software and data includes customer conversation advancement program 122.

Communications unit 210, in these examples, provides for communications with other data processing systems or devices. In these examples, communications unit 210 includes one or more network interface cards. Communications unit 210 may provide communications through the use of either or both physical and wireless communications links. Program instructions and data (e.g., software and data) used to practice embodiments of the present invention may be downloaded to persistent storage 208 through communications unit 210.

I/O interface(s) 212 allows for input and output of data with other devices that may be connected to each computer system. For example, I/O interface(s) 212 may provide a connection to external device(s) 218, such as a keyboard, a keypad, a touch screen, and/or some other suitable input device. External device(s) 218 can also include portable computer readable storage media, such as, for example, thumb drives, portable optical or magnetic disks, and memory cards. Program instructions and data (e.g., software and data) used to practice embodiments of the present invention can be stored on such portable computer readable storage media and can be loaded onto persistent storage 208 via I/O interface(s) 212. I/O interface(s) 212 also connect to display 220.

Display 220 provides a mechanism to display data to user 435 and may be, for example, a computer monitor.

Figure 3:
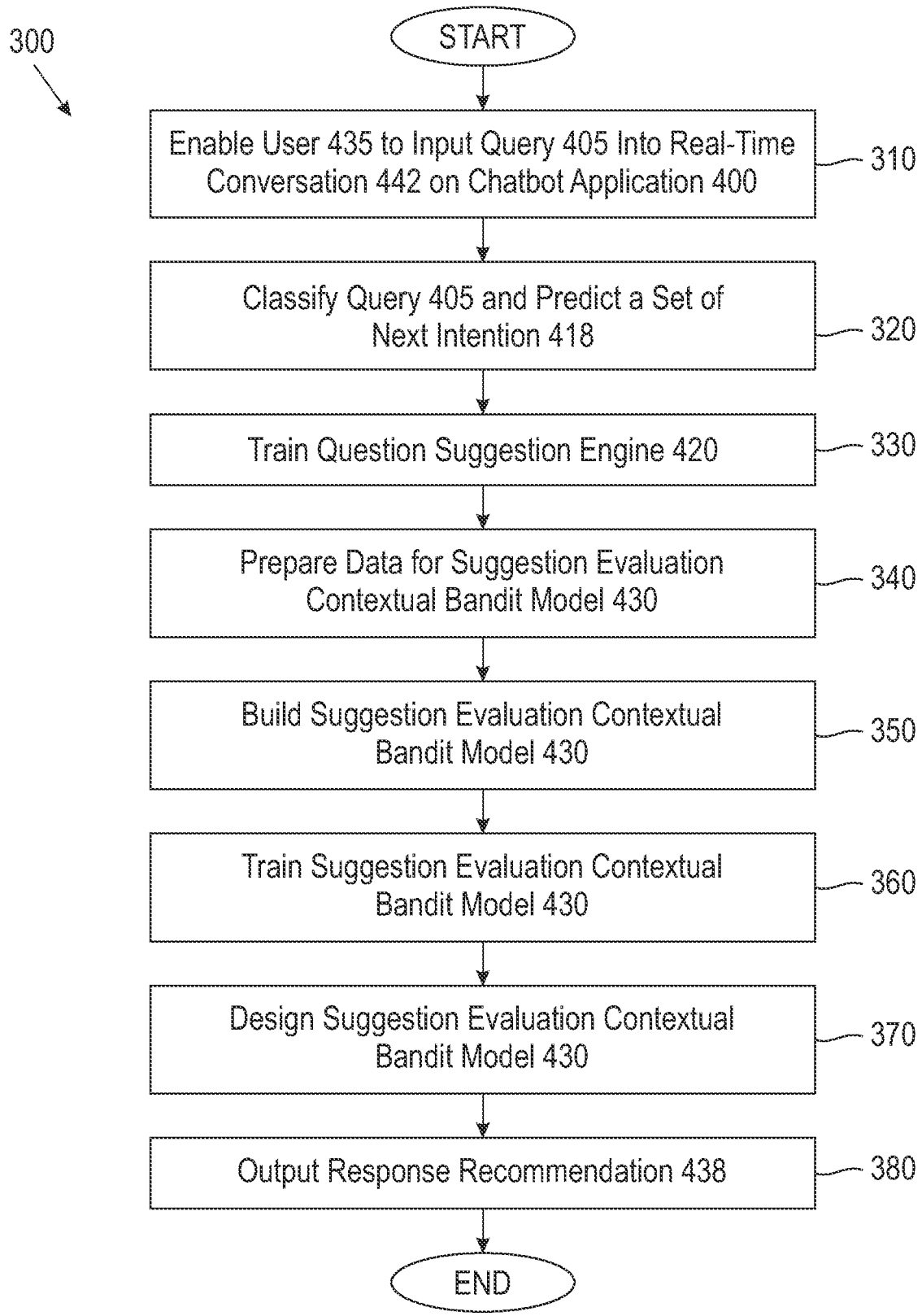
FIG. 3 is a flowchart illustrating the operational steps of a customer conversation advancement program, on the server within the distributed data processing environment of FIG. 1, in accordance with an embodiment of the present invention.

FIG. 3 is a flowchart, generally designated 300, illustrating the operational steps of customer conversation advancement program 122 on server 120 in distributed data processing environment 100, such as the one depicted in FIG. 1, in accordance with an embodiment of the present invention. In an embodiment, customer conversation advancement program 122 operates to analyze a plurality of historical transcripts of real-time conversations 444 on chatbot application 400 that were transferred from a chatbot to a customer support agent; to label the act of transferring in each of the plurality of historical transcripts of real-time conversations 444 on chatbot application 400 as a success or as a failure; and to calculate the likelihood suggesting questions to the customer will result in a success and the likelihood transferring the current real-time conversation 442 to a customer support agent will result in a success using suggestion evaluation contextual bandit model 430. It should be appreciated that the process depicted in FIG. 3 illustrates one possible iteration of customer conversation advancement program 122, which may be repeated for each real-time conversation 442 on chatbot application 400.

In step 310, customer conversation advancement program 122 (hereinafter referred to as "program 122") enables a user to input a query into a real-time conversation on a chatbot application. In an embodiment, program 122 enables user 435 to input query 405 into real-time conversation 442 on chatbot application 400 through user interface 440 of user computing device 130. In an embodiment, program 122 receives query 405 through real-time conversation 442 on chatbot application 400 as an input. In an embodiment, program 122 outputs query 405 from real-time conversation 442 to intent classifier 412 of intent classifier and predictor engine 410.

Reference is made herein to chatbot application 400 receiving query 405 from user 435 as an input. However, it should be understood that the term "query" used herein—regarding query 405 received and processed by chatbot application 400—includes, more generally, one or more utterances, such as requests, statements, and questions input by user 435 in natural language format (i.e., as unstructured data).

In step 320, program 122 classifies the query and predicts a set of intentions. In an embodiment, responsive to enabling user 435 to input query 405 into real-time conversation 442 on chatbot application 400, program 122 classifies query 405 and predicts a set of predicted next intentions 418 (hereinafter referred to as a "set of predicted next intentions 418"). In an embodiment, program 122 classifies query 405 and predicts the set of predicted next intentions 418 in real-time using intent classifier and predictor engine 410. The operational steps of the classification of intention 414 and the prediction of the set of predicted next intentions 418 by intent classifier and predictor engine 410 are depicted and described in further detail in FIG. 4. In an embodiment, program 122 outputs the set of predicted next intentions 418 from intent classifier and predictor engine 410 to question suggestion engine 420.

In step 330, program 122 trains the question suggestion engine. In an embodiment, responsive to classifying query 405 and predicting the set of predicted next intentions 418, program 122 trains question suggestion engine 420. Question suggestion engine 420 operates to advance the user's conversation (e.g., move the user's conversation further along the buyer journey path—i.e., towards a successful resolution) by filtering out one or more intentions from the set of predicted next intentions 418 that do not progress the user's conversation. The operational steps of the training 610 of question suggestion engine 420 are depicted and described in further detail in FIG. 6A. The operational steps for an intention-based question suggestion component 650 of program 122 used to advance a transaction conducted via chatbot application 400 are depicted and described in further detail in FIG. 6B. In an embodiment, program 122 outputs a set of suggested questions 428 from question suggestion engine 420 to suggestion evaluation contextual bandit model 430.

Once question suggestion engine 420 is trained, the training aspect of step 330 will be skipped. That means, during future iterations of program 122, program 122 will only run question suggestion engine 420 and output a set of suggested questions 428 from question suggestion engine 420 to suggestion evaluation contextual bandit model 430.

In step 340, program 122 prepares data for the suggestion evaluation contextual bandit model. In an embodiment, responsive to training question suggestion engine 420, program 122 prepares data for suggestion evaluation contextual bandit model 430. In an embodiment, program 122 gathers a plurality of historical transcripts of real-time conversations 444 on chatbot application 400 that were transferred from a chatbot to a customer support agent from database 124. In an embodiment, program 122 allocates one or more intentions from the set of predicted next intentions 418 to the most appropriate buyer stage of the plurality of buyer stages (i.e., try, learn, late-learn, and buy) identified in the plurality of historical transcripts of real-time conversations 444. In an embodiment, program 122 labels the act of transferring from a chatbot to a customer support agent in each of the plurality of historical transcripts of real-time conversations 444 as a success or as a failure. The act of transferring from a chatbot to a customer support agent is a success when the real-time conversation ends with a successful resolution (e.g., the resolution of a technical problem, the purchase of a product, the enlistment in a trial, etc.). The act of transferring from a chatbot to a customer support agent is a failure when the real-time conversation ends with an unsuccessful resolution. In an embodiment, program 122 enumerates one or more option selection rules. In an embodiment, program 122 enumerates one or more option selection rules to eliminate any repetitiveness. The one or more option selection rules enumerated include, but are not limited to, (i) Do not suggest the current intention as the next intention; (ii) Do not suggest a transfer to a customer support agent in consecutive responses; and (iii) Do not suggest a transfer to a customer support agent in states with no previous context. It should be noted that option selection rule (ii) affects future states but is not accounted for in order to maintain model simplicity. The term "state" or "states" will be defined and clarified in step 350.

In step 350, program 122 builds the suggestion evaluation contextual bandit model. In an embodiment, responsive to preparing data for suggestion evaluation contextual bandit model 430, program 122 builds suggestion evaluation contextual bandit model 430. In an embodiment, program 122 defines a plurality of states. In an embodiment, program 122 defines a plurality of states that are to be used to simplify real-time conversation 442 on chatbot application 400 into a small tractable number of states.

Figure 7:
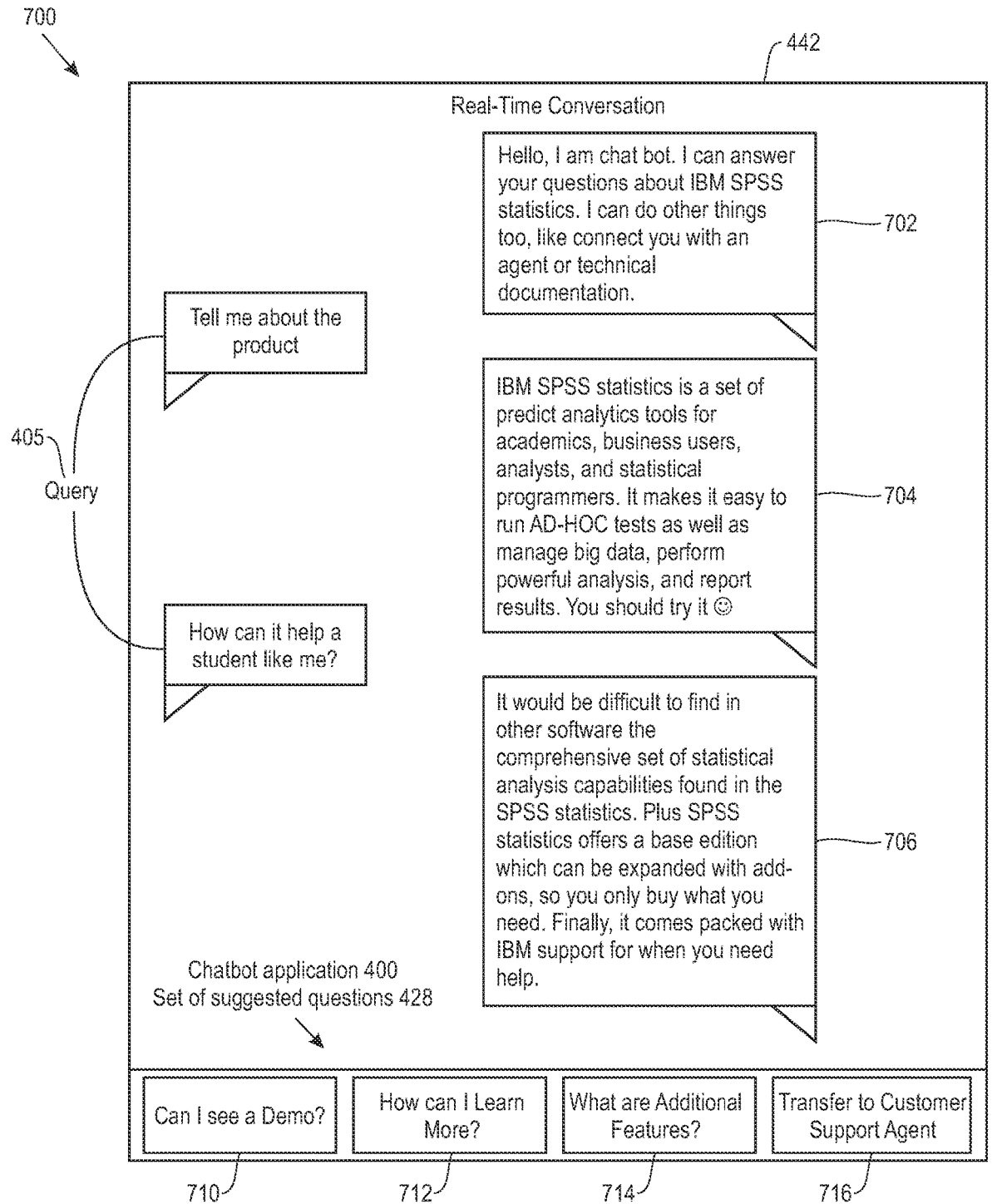
FIG. 7 illustrates an example of a real-time conversation within the chatbot application, in accordance with an embodiment of the present invention.

An example of real-time conversation 442 on chatbot application 400 is depicted in FIG. 7, in accordance with an embodiment of the present invention. Real-time conversation 442 on chatbot application 400 contains, but is not limited to, one or more queries 405; one or more conventional chatbot responses, according to well-known methods and structures, such as conventional chatbot responses 702, 704, and 706; intent classifier 412 (not shown); user clicks (not shown); and a set of actions that user 435 may wish to take to further real-time conversation 442, e.g., questions 710, 712, 714, and 716.

In an embodiment, program 122 defines a plurality of states including, but not limited to, (i) a state marking the start of real-time conversation 442 on chatbot application 400; (ii) an absorption state marking the end of real-time conversation 442 on chatbot application 400; (iii) a no previous context state marking the start of a second user utterance during real-time conversation 442 on chatbot application 400; and (iv) a state marking the start of each of the plurality of buyer stages (i.e., try, learn, late-learn, and buy) during real-time conversation 442 on chatbot application 400 and whether the previous state was more advanced, less advanced, or the same as the current state. For example, program 122 defines the state marking the start of each of the plurality of buyer stages (i.e., try, learn, late-learn, and buy) during real-time conversation 442 on chatbot application 400 and whether the previous state was more advanced, less advanced, or the same as the current state, i.e., (Previous-higher|Try), (Previous-same|Learn), and (Previous-lower-|Buy). A previous-higher state occurs towards the beginning of a buyer journey, whereas a previous-lower states occurs towards the end of a buyer journey. This is assuming that the state user 435 is currently at is the same state user 435 needs to be at for there to be a successful resolution of real-time conversation 442 on chatbot application 400.

In another embodiment, program 122 defines a plurality of states as if, in real-time conversation 442 on chatbot application 400, there was a more advanced buyer stage, a less advanced buyer stage, or the same buyer stage as the current state. For example, program 122 defines a state as (Previous-had-higher|Try) and another state as (Previous-had-same|Buy).

In another embodiment, program 122 defines a plurality of states as a cycle motion, rather than as a forward-backward motion, if the states have a continuous component, (i.e., the next intention prediction vector). For example, program 122 defines a full state as (Previous-higher|Try|v_hat) where v_hat is the next intention confidence vector. In another example, program 122 defines the states as try, learn, and buy. Program 122 helps user 435 progress through these states. In addition to these states, program 122 recognizes there is a continuous component. Program 122 tracks the predictions that could have been made. Program 122 predicts a plurality of intentions, which are also vectors. The next intent predictor creates an even larger vector, such that query 1 is actually intention 2 and query 2 and 3 are actually intention 1.

In an embodiment, program 122 enables a customer support agent to select an action from a set of actions. In an embodiment, program 122 enables a customer support agent to select an action from a set of actions to take to present one or more options to user 435 in real-time conversation 442 on chatbot application 400. The set of actions includes, but is not limited to, (i) show the top three next intentions from the set of predicted next intentions 418 and (ii) show the top two next intentions from the set of predicted next intentions 418 and transfer to a customer support agent.

In an embodiment, program 122 defines a plurality of rewards. In an embodiment, program 122 defines a plurality of rewards that have tunable parameters based on business considerations. The plurality of rewards includes, but are not limited to, 1 if user 435 clicks on the set of suggested questions 428; A, which is equal to 10, if user 435 is transferred to a customer support agent and real-time conversation 442 is labeled as successful; and B, which is equal to −10, if user 435 is transferred to a customer support agent but real-time conversation 442 is labeled as unsuccessful. The plurality of rewards is measured and compared to what user 435 has previously done. Therefore, it is necessary to receive a plurality of utterances from user 435 so that program 122 has another utterance to compare to the current utterance. In an embodiment, program 122 uses an epsilon greedy learning algorithm to define the plurality of rewards. When using the epsilon greedy learning algorithm, an action is selected based on its reward. The optimal action is always selected. That means, the maximum reward possible for a given state is generated. The aim of the epsilon greedy learning algorithm is to balance exploration and exploitation. Therefore, exploration is used to look for new options, while exploitation is used to take advantage of prior knowledge.

In step 360, program 122 trains the suggestion evaluation contextual bandit model. In an embodiment, responsive to building suggestion evaluation contextual bandit model 430, program 122 trains suggestion evaluation contextual bandit model 430. In an embodiment, program 122 gathers the plurality of historical transcripts of real-time conversations 444 on chatbot application 400 that were transferred from a chatbot to a customer support agent from database 124 and that were labeled as a success or as a failure.

In an embodiment, program 122 converts the labeled outcome to a reward. If the labeled outcome is a success, the reward is either A for suggesting a transfer to a customer support agent; 1 if the set of predicted next intentions 418 suggested appears in the real-time conversation; or 0. If the labeled outcome is a failure, the reward is B for suggesting the transfer to a customer support agent; 1 if the set of predicted next intentions 418 suggested appears in the real-time conversation; or 0. In an embodiment, program 122 performs a random dropout on each real-time conversation of the plurality of historical transcripts of real-time conversations 444 on chatbot application 400. In an embodiment, program 122 performs random dropouts on each real-time conversation in order to change the conversation history and randomize the current state of real-time conversation 444 before the real transfer to a customer support agent. In an embodiment, program 122 trains suggestion evaluation contextual bandit model 430 on the augmented set of conversations (i.e., from the plurality of historical transcripts of real-time conversations 444 on chatbot application 400).

In step 370, program 122 designs the suggestion evaluation contextual bandit model. In an embodiment, responsive to training suggestion evaluation contextual bandit model 430, program 122 designs suggestion evaluation contextual bandit model 430. In an embodiment, program 122 designs suggestion evaluation contextual bandit model 430 with the goal of maximizing the expected reward.

In an embodiment, program 122 defines the expected reward by a potential state, a potential action, and a potential outcome. The potential state is defined as (p_x, c, v_hat), where p_x is a previous buyer stage, c is a current buyer stage, and v_hat is the next intention confidence vector. The potential actions include, but are not limited to, (i) Q3, where Q3 is to show three suggested questions and (ii) Q2,T, where Q2 is to show two questions and a transfer option. The potential outcomes include, but are not limited to, (i) q_c=1, where q_c is a question is clicked; (ii) t_c, where t_c is a transfer is clicked; (iii) s_t=A, where s_t is a successful transfer; (iv) u_t=B, where u_t is an unsuccessful transfer; and (v) 0. In an embodiment, program 122 takes each utterance as an independent task.

In an embodiment, program 122 defines the goal of maximizing the expected reward as max(E[R]) where E[R] is the expected reward R. E[R] is defined as:

$$E[R]=E[R|Q3]+E[R|Q2,T];$$

where $E[R|Q3]=P(q\_c|Q3)$; $E[R|Q2,T]=P(q\_c|Q2,T)+A*P(s\_t,t\_c|p\_x,c,v\_hat)+B*P(u\_t,t\_c|p\_x,c,v\_hat)$; and $E[R|Q2,T]=P(q\_c|Q2,T)+A*P(s\_t|t\_c,p\_x,c,v\_hat)P(t\_c|p\_x,c,v\_hat)+B(1-P(s\_t|t\_c,p\_x,c,v\_hat))P(t\_c|p\_x,c,v\_hat)$.

In an embodiment, program 122 simplifies the model by assuming independence of t_c and s_t,u_t. In an embodiment, program 122 estimates $P(q\_c|Q3)$, $P(q\_c|Q2,T)$, $P(s\_t|t\_c,p\_x,c,v\_hat)$, and $P(t\_c|p\_x,c,v\_hat)$. In an embodiment, program 122 trains linear regression model M_1 to predict $P(q\_c|Q3)$. M_1 can take the form of y=MX+B, where X is a concatenated state vector and y is the probability of clicking a question. In an embodiment, program 122 constructs, in a naïve solution, linear regression models M_2, M_3 and M_4 that can be updated to estimate the remaining three probabilities. In an embodiment, program 122, alternatively, extracts more information from the model to construct only M_1 and a second model M_2 that models the entire function E[R|Q2,T]. This model has a similar architecture to the linear regression model but adds abstraction through a single fully connected hidden layer. A simple logic engine at the end combines the outputs of the models in either architecture to select the optimal action.

In step 380, program 122 outputs a response recommendation. In an embodiment, responsive to designing suggestion evaluation contextual bandit model 430, program 122 outputs response recommendation 438. In an embodiment, program 122 outputs a response recommendation (i.e., a set of actions that user 435 may wish to take to further real-time conversation 442, e.g., questions 710, 712, 714, and 716). In an embodiment, program 122 outputs response recommendation 438 to user 435 in real-time conversation 442 on chatbot application 400 through user interface 440 of user computing device 130.

Figure 4:
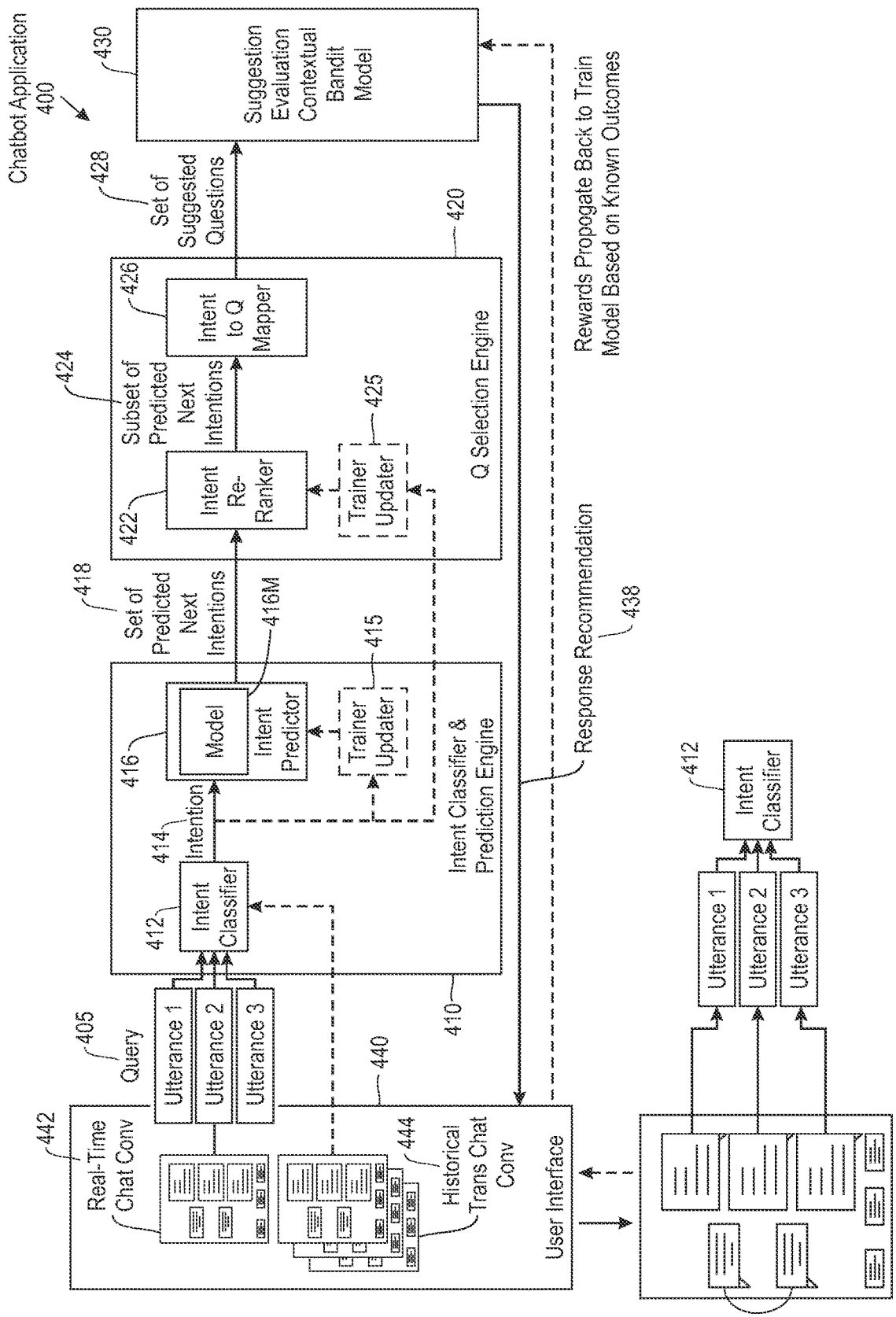
FIG. 4 is a block diagram illustrating the components of a chatbot application, within distributed data processing environment of FIG. 1, in accordance with an embodiment of the present invention.

FIG. 4 is a block diagram illustrating the components of chatbot application 400, within distributed data processing environment 100 of FIG. 1, in accordance with an embodiment of the present invention. FIG. 4 provides only an illustration of one embodiment of the components of chatbot application 400 and does not imply any limitations with regard to the environments in which different embodiments may be implemented. Many modifications to the depicted environment may be made by those skilled in the art without departing from the scope of the invention as recited by the claims.

In an embodiment, chatbot application 400 includes intent classifier and prediction engine 410, question suggestion engine 420, and suggestion evaluation contextual bandit model 430. In an embodiment, intent classifier and prediction engine 410 includes intent classifier 412 and intent predictor 416. In an embodiment, question suggestion engine 420 includes intent re-ranker 422 and intent-to-question mapper 426.

In an embodiment, responsive to receiving query 405, intent classifier and predictor engine 410 outputs query 405 to intent classifier 412. In an embodiment, responsive to receiving query 405, intent classifier 412 classifies query 405 as intention 414. In an embodiment, responsive to classifying query 405 as intention 414, intent classifier 412 outputs intention 414 to intent predictor 416. In an embodiment, responsive to receiving intention 414, intent predictor 416 predicts a set of predicted next intentions 418. In an embodiment, intent predictor 416 predicts the set of predicted next intentions 418 in real-time. In an embodiment, intent predictor 416 predicts the set of predicted next intentions 418 based on a pattern of queries 405 recognized by intent classifier and predictor engine 410.

In an embodiment, intent classifier and predictor engine 410 outputs the set of predicted next intentions 418 to question suggestion engine 420. In an embodiment, responsive to receiving the set of predicted next intentions 418, question suggestion engine 420 generates a set of suggested questions 428. In an embodiment, question suggestion engine 420 presents the set of suggested questions 428 to user 435 in real-time conversation 442, via user interface 440 of user computing device 130. The set of suggested questions 428 are questions that user 435 may ask chatbot application 400 to further the dialog of real-time conversation 442.

Reference is made herein to intent classifier and predictor engine 410 of chatbot application 400 receiving query 405 from program 122 as an input. However, it should be understood that the term "query" used herein includes, more generally, questions generated and presented to user 435 by question suggestion engine 420 and then selected by user 435.

Reference is made herein to the set of predicted next intentions 418. Embodiments of the present invention recognize the importance of intention 414 in real-time conversation 442. Embodiments of the present invention recognize that, with chatbot application 400 in live conversation mode, as shown by the solid arrows in FIG. 4, machine-based, classification of intentions (i.e., commercially available via a Watson Assistant service from International Business Machines Corporation) may be applied by intent classifier and predictor engine 410 to generate the set of predicted next intentions 418 in real-time. Embodiments of the present invention recognize that, with chatbot application 400 in development/update mode, which is done off-line, as shown by the dashed arrows in FIG. 4, machine-based, classification of intentions (i.e., commercially available via a Watson Assistant service from International Business Machines Corporation) may be applied during supervised training of intent classifier and predictor engine 410.

In development/update mode, intent classifier 412 is used for building or training model 416M for intent predictor 416 via trainer/updater 415. A set of intentions is predefined for intent classifier 412, according to embodiments of the present invention. For example, a set of intentions 414 for intent classifier 412 are defined as Product Benefits, Use Case, Base Features, Features Analytics, Features Infrastructure, Product Differentiation, Features Customize, Features Import/Export, License Code, System Requirements, Large Scale Installations, Version Demo, Version Compare, Version Free Trial, Troubleshooting Tech Support, Buy, Purchase Options, Pricing, and Renewal.

In development/update mode, intent classifier 412 receives query 405 from historic transcripts of real-time conversations 444 and responsively classifies query 405 as corresponding historic intentions 414, which intent classifier 412 outputs to trainer/updater 415. For at least one type of model included in intent predictor 416, according to an embodiment, trainer/updater 415 configures a sequence of intentions 414 as training data sample pairs, which trainer/updater 415 then uses to build and train an intent predictor model that trainer/updater 415 outputs to intent predictor 416 to use during run-time for generating the set of predicted next intentions 418 in response to query 405.

Figure 5:
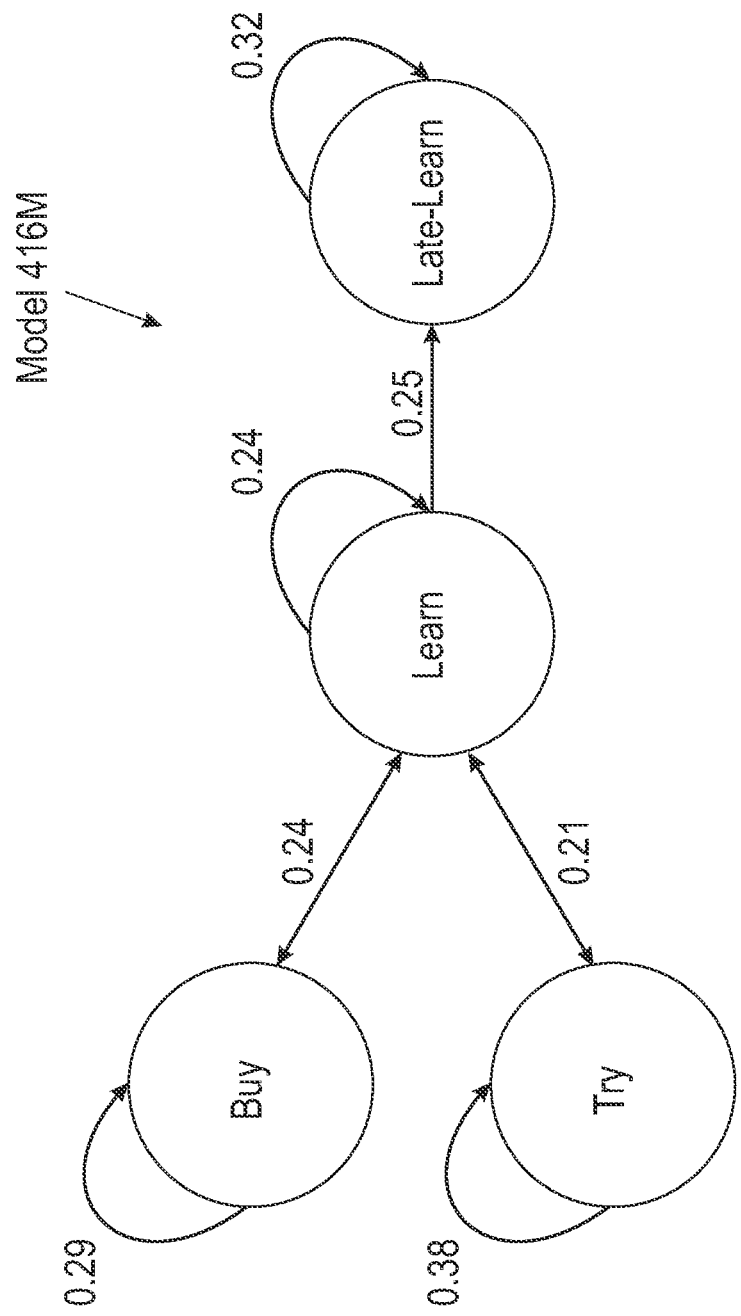
FIG. 5 illustrates a Markov type model, in accordance with an embodiment of the present invention.

For at least Markov type model 416M, shown in more detail in FIG. 5, for example, trainer/updater 415 builds a matrix of intention 414 pair frequencies by counting occurrences of each kind of intention 414 pair types. In this context, an "intention 414 pair" refers to a first intention occurring in an intention 414 sequence before a second intention 414, which may or may not be the same as the first intention 414. The second intention 414 is output by intent classifier 412 in direct response to a second query 405 immediately after outputting the first intention 414 in direct response to a first query 405, where the first query 405 occurred in historical transcripts of real-time conversations 444 immediately before the second query 405. Thus, for an example where intentions 414 are predefined as type 1, type 2 ... type N, "counting occurrences of each kind of intention 414 pair types" refers to counting how many times intention type 1 immediately precedes intention type 1 (which provides a (type 1, type 1) type of intention pair), how many times intention type 1 immediately precedes intention type 2 (which provides a (type 1, type 2) type of intention pair), and so on through how many times intention type 1 immediately precedes intention type N (which provides a (type 1, type N) type of intention pair); also counting how many times intention type 2 immediately precedes intention type 1 (which provides a (type 2, type 1) type of intention pair), and so on through how many times intention type 2 immediately precedes intention type N (which provides a (type 2, type N) type of intention pair); and so on for all N types. Trainer/updater 415 then normalizes these frequency counts to convert them into probabilities, where each probability indicates the likelihood that one certain type of intention pair occurs after another certain type. Variables indicating respective intention pair types may then be set out with their respective probabilities in a transition matrix, which is a way of defining a Markov model.

In other embodiments, other types of models are used for model 416M, such as recurrent neural networks, which may include a long short-term memory model. In general, methods of developing and applying models of various types are well-known. Consequently, further details of developing model 416M are not presented herein. However, what is disclosed herein goes far beyond merely developing and applying a well-known type of model. That is, according to an embodiment of the present invention, model 416M is developed and trained based on intentions 414 underlying query 405 in historical transcripts of real-time conversations 444, where model 416M predicts the set of predicted next intentions 418 that will underlie the next query 405, where the set of predicted next intentions 418 provide a basis for question suggestion engine 420 to suggest the set of suggested questions 428 to user 435, such as described in the following.

Based on model 416M and received intention 414, intent predictor 416 outputs the set of predicted next intentions 418 with respective probabilities for each predicted next intention of the set of predicted next intentions 418 to intent re-ranker 422 of question suggestion engine 420. In an embodiment of the present invention, question suggestion engine 420 includes an intent-to-question mapper 426 configured to generate the set of suggested questions 428 that chatbot application 400 predicts user 435 may wish to ask next and, significantly, that chatbot application 400 also determines may be productive, as further explained herein. Intent-to-question mapper 426 generates the set of suggested questions 428 in response to receiving a subset of predicted next intentions 424 (i.e., the best predicted next intentions) from intent re-ranker 422, which intent-to-question mapper 426 does, in an embodiment, by selecting and presenting questions from a pre-built database 427 that maps the subset of predicted next intentions 424 to the corresponding set of suggested questions 428 that have been manually prepared and stored in database 124 prior to operating chatbot application 400 in live conversation mode.

In order to limit output of intent-to-question mapper 426 to the set of suggested questions 428 that are most productive, intent re-ranker 422 selects a subset of predicted next intentions 424 from the set of predicted next intentions 418 that intent re-ranker 422 receives from intent predictor 416 and outputs the subset of predicted next intentions 424 to intent-to-question mapper 426. More specifically, intent re-ranker 422 outputs only the subset of predicted next intentions 424 based on ranking the set of predicted next intentions 418 according to a productive value ranking algorithm.

In an embodiment, the productive value ranking algorithm of intent re-ranker 422 provides a measure of business value for each predefined type of the set of predicted next intentions 418 that intent re-ranker 422 may receive, as described herein. In an embodiment, intent re-ranker 422 outputs the subset of predicted next intentions 424 of the set of predicted next intentions 418 (i.e., the three highest ranked predicted next intentions of the set of predicted next intentions 418) to intent-to-question mapper 426 for each transaction in real-time conversation 442 to ensure that intent-to-question mapper 426, in turn, only generates the set of suggested questions 428 that have the highest value.

With regard to the aforementioned "transaction" in real-time conversation 442, each query 405 received by intent classifier 412 may be deemed a transaction in this context. For each query 405, intent classifier 412 generates a corresponding intention 414, according to an embodiment of the present invention. In turn, intent predictor 416 generates and outputs the set of predicted next intentions 418 and likelihoods for each respective one. The set of predicted next intentions 418 may be referred to herein as an intent probability vector, since it includes predicted next intentions and a probability—also known as a "likelihood"—for each such predicted intention. This causes intent re-ranker 422 to select and output the highest valued intentions of the set of predicted next intentions 418, such as the top three for example. In turn, intent-to-question mapper 426 outputs three suggested questions from the set of suggested questions 428 to user 435. When user 435 selects one of the three suggested questions from the set of suggested questions 428 or enters a different question, remark, or request, this begins a next transaction and the above transaction cycle repeats.

The ranking algorithm of intent re-ranker 422 assigns each intent of vector 418 (i.e., the set of predicted next intentions 418) a score that indicates how valuable it is to an enterprise for which chatbot application 400 is deployed, where the algorithm includes a transformation function and a scoring function. The transformation function transforms the received next intent probability vector 418 using the scoring function, whereupon intent re-ranker 422 outputs top ranked intentions (i.e., intentions 414) of vector 418 (i.e., the set of predicted next intentions 418). In one embodiment of intent re-ranker 422, which may be referred to as a "buyer stage journey" embodiment, the scores are predetermined manually and correlate with a buyer stage in a buyer stage journey, where respective buyer stages are predefined and mapped manually to one or more intentions (i.e., intentions 414) that intent classifier 412 is predefined to recognize. The following is an example, according to an embodiment of the present invention:

Buyer stage: Discover/Score: 1
Example of predefined intentions for the Discover stage:
Product Benefits
Example utterances for this intention:
What are the benefits of this product?
Why is this product great?
Why do I need this product?
Use Case
Example utterances for this intention:
What are the use cases?
How can I use this product?
Buyer stage: Learn/Score: 2
Example of predefined intentions for the Learn stage:
Base Features
Example utterances for this intention:
Tell me about the basic functions
What are the key features?
Features Analytics
Example utterances for this intention:
Can I use this to analyze charts?
Can this help me with analytics?
Features Infrastructure
Example utterances for this intention:
Does it run on the cloud?
Is this a cloud service?
How does it work from an infrastructure side?
Product Differentiation
Example utterances for this intention:
What is the difference between this and its competitors?
Why should I buy this product instead?
What can this product do that others cannot?
Buyer stage: Late Learn/Score: 3
Example of predefined intentions for the Late Learn stage:
Features Customize
Example utterances for this intention:
How can I customize the features of this product for my needs?
What customizations can I add to the product?
Are there any customizations to make this product run faster on my Windows machine?
Features Import/Features Export
Example utterances for this intention:
What is the file type for import?
What file types can you export?
Are file exports compatible with Excel?
License Code
Example utterances for this intention:
Do I have a license code?
What is the license code?
System Requirements
Example utterances for this intention:
What are the system requirements?
What requirements do I need for a Windows Machine?
What requirements do I need for a Mac?
Buyer stage: Try/Score: 4
Example of predefined intentions in the Try stage:
Version Demo
Example utterances for this intention:
Can I see a Demo?
Where can I find a demo?
How can I get access to a demo?
Is there a demo with a financial use case?
Version Compare
Example utterances for this intention:
Can you tell me the difference between the gold version and the platinum version?
Can you tell me the difference between the student version and the professional version?
What is the difference between v9 and v11?
Version Free Trial
Example utterances for this intention:
Is there a free trial?
Where can I find a trial for no cost?
I am student, is there a free trial available for me.
Troubleshooting Tech Support
Example utterances for this intention:
My download is not working, is there some technical documentation or support?
I am having support problems.
Do you know why the tool won't work on my Windows Machine?

Buyer state: Buy/Score: 5
Example of Intentions in the Buy stage:
Buy
    Example utterances for this intention:
      How can I buy the product?
      Where can I buy the product?
        Purchase Options
    Example utterances for this intention:
      How can I purchase the product?
      Where can I purchase the product?
      What are my options for buying the product?
Pricing
    Example utterances for this intention:
      What is the price of the standard edition?
      What is the price of the product?
      I am a student, is there a special price for me?
Renewal
    Example utterances for this intention:
      How can I renew my subscription?
      Where can I go to renew my subscription?
      Can you tell me options for renewal?

According to the above described "buyer stage journey" embodiment of the present invention, each type of intention 414 that intent classifier 412 is configured to identify is assigned to be associated with one of the buyer stages during training for intent re-ranker 422. The predefined score assigned to a respective buyer stage applies to any of the intentions 414 of that buyer stage, where that score is used by intent re-ranker 422 when scoring a set of predicted next intentions 418 for real-time conversation 442.

In another embodiment of intent re-ranker 422, which may be referred to herein as a "simple score" embodiment, the ranking algorithm gives each intention of vector 418 a score from 1 to 100 that is predefined manually for each possible one of the respective intentions 414 that intent classifier 412 is predefined to recognize. The intentions in this embodiment are scored independently of journey stages.

In another embodiment of intent re-ranker 422, which may be referred to herein as a "intent sequence/probability" embodiment, for intentions 414 that intent classifier 412 can recognize, the ranking algorithm gives each intention of vector 418 a score indicating historic tendencies of given sequences of intention 414. For example, given an initial input intention 414 sequence of [General_Information, Get_Started, Basic_Features] and a predicted next intention vector 418 of Trial 30%, Pricing 20%, Features_Analytics 10% and Demo 5% (where the % values indicate likelihoods for each of the indicated next predicted intentions 418, Trial, Pricing, Features_Analytics and Demo), ranking algorithm scores each of the following possible sequences, in order to determine relative values of the set of suggested questions 428 whose underlying intentions 414 are, respectively: Trial, Pricing, Features_Analytics or Demo:

i. [General_Information, Get_Started, Basic_Features, Trial]
ii. [General_Information, Get_Started, Basic_Features, Pricing]
iii. [General_Information, Get_Started, Basic_Features, Features_Analytics]
iv. [General_Information, Get_Started, Basic_Features, Demo]

To configure this intent re-ranker 422 ranking algorithm, a score is first assigned manually to each intention 414 that intent classifier 412 is configured to recognize. The ranking algorithm is then configured to extract intention sequences generated by intent classifier 412 from historical transcripts of real-time conversations 444, whereupon the intention sequence/probability algorithm of trainer/updater 425 trains on those extracted sequences, which includes calculating scores for each of the above listed intention sequences (i) through (iv).

More specifically, trainer/updater 425 computes an initial score for the above intention sequence (i), by adding up the scores assigned to each of the intentions in the sequence, General_Information, Get_Started, Basic_Features and Trial. Trainer/updater 425 also extracts from historical transcripts of real-time conversations 444, each subset of conversations that generated intention 414 sequences corresponding to intention 414 sequence (i) (hereinafter referred to as the "sequence (i) subset"). Trainer/updater 425 then determines the maximum valued intention that occurred after sequence (i) in each transcript of the sequence (i) subset. Trainer/updater 425 computes a sum of the initial score plus the scores for these max valued intentions for the sequence (i) subset, normalizes the sum by dividing the sum by [the number of historical transcripts of real-time conversations 444 for sequence (i)] or, alternatively, a sum that includes the number of historical transcripts of real-time conversations 444 for sequence (i), such as [1+the number of historical transcripts of real-time conversations 444 for sequence (i)], for example. Trainer/updater 425 may then save for future reference the normalized sum as a final score (Si) for the subsequence (i) subset of historical transcripts of real-time conversations 444.

Alternatively, before saving the normalized score as the final score (Si) for sequence (i), trainer/updater 425 may adjust the normalized score based on the probability associated with the predicted next intention 418 included in sequence (i), i.e., in this example, 30% for the predicted next intention "Trial." For example, may increase or decrease the normalized score (Si) depending on the magnitude of the probability associated with the predicted next intention included in sequence (i) relative to magnitudes of the probabilities associated with the other predicted next intentions including in intent vector 418, where scores for higher magnitude probabilities are increased and vice versa. In another alternative, rather than adjusting normalized scores based on associated probabilities, intent re-ranker 422 may use the probabilities in the process of selecting the scored, next predicted intentions 418 for outputting to intent-to-question mapper 426.

For each sequence (ii), (iii), and (iv), trainer/updater 425 repeats the above extraction of subsets of historical transcripts of real-time conversations 444, summation of scores, normalizing and saving. Then trainer/updater 425 orders the sequences (i) through (iv) by ranking of their respective sums (Si), (Sii), (Siii) and (Siv).

It should be appreciated from the forgoing that the final scores computed in this fashion from historical transcripts of real-time conversations 444 provide values that indicate a historic degree or tendency for each respective sequence (i) through (iv) to lead to higher scored intentions later in a conversation.

In live conversation mode, intent re-ranker 422 applies the scores (S) to vector 418 to rank predicted next intentions 418 in the live conversation in their contexts of corresponding intention sequences that preceded the respective prediction for next intentions 418, according to which intent re-ranker 422 will select the highest ranked set of predicted next intentions 418, such as the top three, to output as the most valued subset of predicted next intentions 424.

In embodiments, the transformation function of intent re-ranker 422 may be applied as a "simple" filter to one of the above-mentioned intent re-ranker 422 embodiments, wherein the transformation function filters the intention vector down to the three intentions with the highest score without considering the probabilities associated with the intentions in vector 418. In other embodiments, the transformation function of intent re-ranker 422 may be applied as a "weighted probability" filter to transform the score for each intention in vector 418, wherein the transformation function multiplies the score for an intention by the intention's associated probability. In either the simple filter or the weighted probability filter embodiment, intent re-ranker 422 outputs the subset of predicted next intentions 424 that have the highest transformed scores, such as the top three, for example.

Figure 6A:
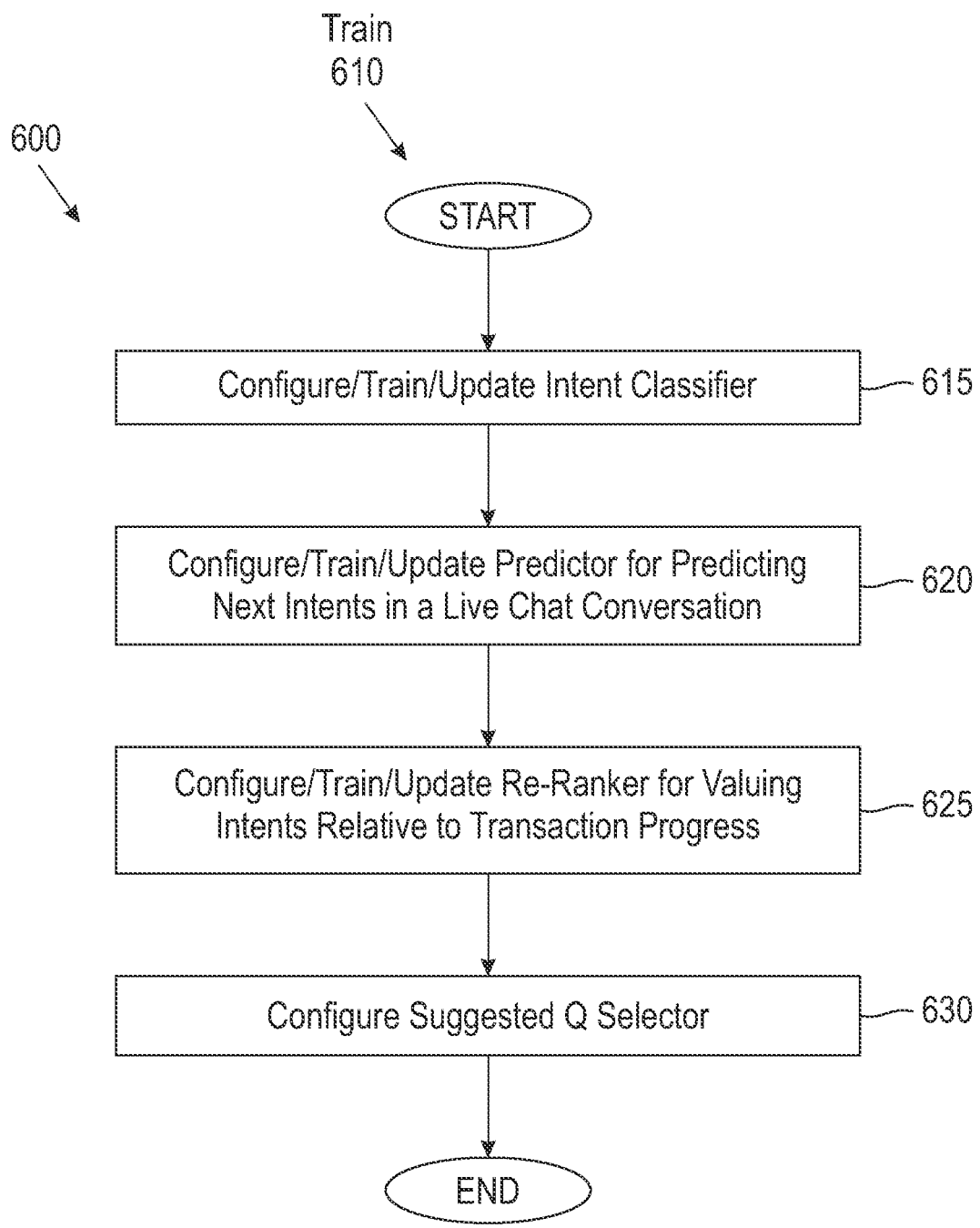
FIG. 6A and FIG. 6B are flowcharts illustrating, in greater detail, the operational steps of an intention-based question suggestion component of the customer conversation advancement program used to advance a transaction conducted via the chatbot application, such as the one depicted in FIG. 4, in accordance with an embodiment of the present invention.
Figure 6B:
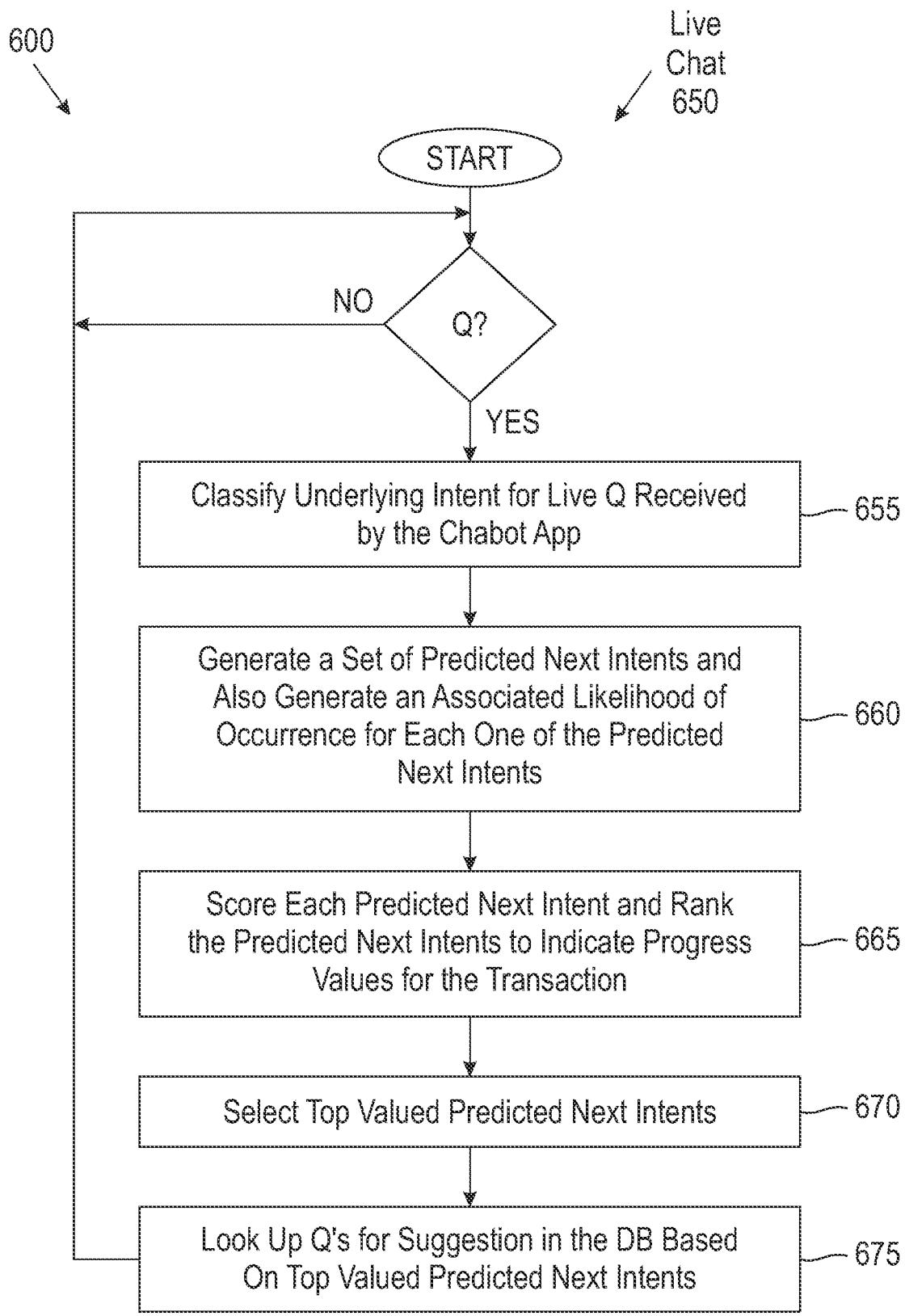

FIG. 6A and FIG. 6B are flowcharts illustrating, in greater detail, the operational steps of an intention-based question suggestion component 600 of program 122 used to advance a transaction conducted via the chatbot application, such as the one depicted in FIG. 4, in accordance with an embodiment of the present invention.

With chatbot application 400 in a mode of operation 610 for configuring, training, or updating, at 615, an intent classifier is trained, configured or updated, which includes defining a set of possible intentions for intent classification that may underlie questions relating to transactions discussed in chat conversations to which chatbot application 400 is deployed. Using historical transcripts of previous real-time conversations that concerned the same type of transaction, the intent classifier is trained or configured by manually tagging intentions for questions in the transcripts and feeding the intent-tagged questions to a natural language processing trainer for the intent classifier.

Also, in mode of operation 610 for configuring, training, or updating, at 620, an intent predictor of chatbot application 400 is configured, trained or updated for predicting next intentions in a real-time conversation. This may include using the intent classifier trained at 615 to classify the underlying intention for each question in such historic transcripts of real-time conversations and configuring the predictor to predict next intentions and associated likelihood of occurrence for each one of the predicted next intentions based on intention sequence pairs, that is, (intention, next intention) pairs, generated from the historical transcripts of real-time conversations. In development of one or more embodiments of the present invention, it was an unexpected result that a next intention may be predicted merely from a history of intention-next intention sequence pairs reliably enough to provide useful results in the chatbot application 400 as disclosed herein, e.g., results that enable suggesting next questions to user 435 in a fashion as described herein that actually improve progress for transactions that are the subject of a chatbot conversation, which includes preventing regression in transaction stages.

Also, in mode of operation 610 for configuring, training, or updating, at 625 a re-ranker of chatbot application 400 is configured, trained or updated for valuing intentions relative to progress for the type of transaction for which the chatbot application 400 is deployed. This may include defining stages of the transaction and assigning scores to the stages to indicate a value of each stage in progressing to a successful conclusion of the transaction and assigning each intention of the possible intention set to one of the respective stages of the transaction, wherein the scores assigned to each stage will apply to the intentions assigned to the stage.

Also, in mode of operation 610 for configuring, training, or updating, at 630, a question suggestion engine is configured, trained or updated by manually identifying or preparing questions to suggest to user 435 that user 435 may wish to ask, such as by referring to historical transcripts of real-time conversations for a transaction like the type of transaction for which the chat by application is deployed, and by identifying the intention (from the possible set of intentions) that underlies each question, which may be done manually or using the intent classifier. Then, the questions for suggestion and the associated intentions are stored in a database configured in such a way that the suggested questions can be looked up based on intention.

With chatbot application 400 in a live chat conversation mode of operation 650, an intent classifier, at 655, classifies and outputs at least one underlying intention for a live question received by chatbot application 400. The intent predictor, at 660, generates and outputs a set of predicted next intentions for the received question and also generates and outputs an associated likelihood of occurrence for each one of the predicted next intentions in the set of predicted next intentions. The re-ranker, at 665, scores each predicted next intention and ranks the predicted next intention to indicate progress values for the transaction involved in the chat session. The re-ranker, at 670, selects and outputs a set of top ranked, predicted next intentions. The question selection engine, at 675, looks up questions for suggestion in the database based on the set of top ranked, predicted next intentions and outputs them to user 435 via user interface 440 of user computing device 130. Chatbot application 400, then goes back to 655 to receive a next question, remark, or request from user 435, which may be one of the questions suggested to user 435 by chatbot application 400 at 675.

FIG. 7 illustrates an example of a real-time conversation (i.e., real-time conversation 442) on the chatbot application (i.e., on chatbot application 400), in accordance with an embodiment of the present invention. The real-time conversation on the chatbot application contains, but is not limited to, one or more queries 405; one or more conventional chatbot responses, according to well-known methods and structures, such as conventional chatbot responses 702, 704, and 706; intent classifier 412; user clicks; and the set of actions that user 435 may wish to take to further real-time conversation 442, e.g., questions 710, 712, 714, and 716.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on user 435's computer, partly on user 435's computer, as a stand-alone software package, partly on user 435's computer and partly on a remote computer or entirely on the remote computer or server. In the latter scenario, the remote computer may be connected to user 435's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intention will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    responsive to a user inputting a query into a real-time conversation on a chatbot application through a user interface of a user computing device, classifying, by one or more processors, the query as an intention of the user utilizing an intent classifier and predictor engine;
    predicting, by the one or more processors, a set of next intentions of the user utilizing the intent classifier and predictor engine, wherein the set of next intentions of the user are predicted based on a pattern recognized, in a plurality of queries previously received, by the intent classifier and predictor engine;
    training, by the one or more processors, a question suggestion engine to filter out one or more intentions from the set of next intentions of the user that do not further the real-time conversation on the chatbot application, wherein a subset of next intentions remaining provide a basis for the question suggestion engine to generate a set of suggested queries that the user can ask to further the real-time conversation on the chatbot application;
    generating, by the one or more processors, the set of suggested queries using the question suggestion engine;
    building, by the one or more processors, a suggestion evaluation contextual bandit model that determines whether the real-time conversation on the chatbot application will be resolved successfully if transferred to a customer support agent;
    training, by the one or more processors, the suggestion evaluation contextual bandit model against a set of annotated historical interactions to evaluate a response by a chatbot to the query based on an outcome of the set of historical interactions; and
    outputting, by the one or more processors, a response recommendation into the real-time conversation on the chatbot application through the user interface of the user computing device, wherein the response recommendation includes the set of suggested queries.

2. The computer-implemented method of claim 1, further comprising:
    subsequent to training the suggestion evaluation contextual bandit model, applying, by the one or more processors, the suggestion evaluation contextual bandit model to the query input by the user by comparing a state of the user, the response to the query by the chatbot, and a transfer to the customer support agent to form the response recommendation.

3. The computer-implemented method of claim 1, further comprising:
    preparing, by the one or more processors, the set of data for the suggestion evaluation contextual bandit model by:
        gathering, by the one or more processors, a plurality of historical transcripts of one or more real-time conversations on the chatbot application that were transferred from the chatbot to the customer support agent from a database;
        allocating, by the one or more processors, one or more intentions from the set of next intentions to one or more buyer stages of the real-time conversation on the chatbot application; and
        annotating, by the one or more processors, the plurality of historical transcripts of the one or more real-time conversations on the chatbot application that were transferred from the chatbot to the customer support agent as a success or as a failure.

4. The computer-implemented method of claim 2, wherein a respective real-time conversation of the plurality of historical transcripts of the one or more real-time conversations on the chatbot application that was transferred from the chatbot to the customer support agent is a success when the real-time conversation on the chatbot application ends with a successful resolution and a failure when the real-time conversation on the chatbot application ends with an unsuccessful resolution.

5. The computer-implemented method of claim 1, wherein building the suggestion evaluation bandit model further comprises:
    defining, by the one or more processors, a plurality of states to be used to simplify the real-time conversation on the chatbot application into a small tractable number of states;
    enabling, by the one or more processors, the customer support agent to select an action regarding one or more options to present to the user in the real-time conversation on the chatbot application from a set of actions; and
    defining, by the one or more processors, a plurality of rewards based on what the user has previously done.

6. The computer-implemented method of claim 5, wherein the plurality of states includes a first state marking a start of the real-time conversation; a second state marking an end of the real-time conversation; a no previous context state marking a second start of a second user query during the real-time conversation; and a third state marking a third start of a buyer stage and whether a previous buyer stage was more advanced, less advanced, or the same as the buyer stage.

7. The computer-implemented method of claim 6, wherein the buyer stage is selected from the group consisting of: not interested, try, learn, late-learn, and buy.

8. The computer-implemented method of claim 5, wherein the set of actions is either (i) to show a set comprised of a top three predicted next intentions or (ii) to show a second set of a top two predicted next intentions before transferring to the customer support agent.

9. The computer-implemented method of claim 5, wherein the plurality of rewards defined are 1 if the user clicks on one or more suggested questions; 10 if the user is transferred to the customer support agent and the real-time conversation on the chatbot application is labeled as successful; and −10 if the user is transferred to the customer support agent but the real-time conversation on the chatbot application is labeled as unsuccessful.

10. The computer-implemented method of claim 1, wherein training the suggestion evaluation bandit model against the set of annotated historical interactions to evaluate the response to the query based on the outcome of the set of historical interactions further comprises:

gathering, by the one or more processors, one or more real-time conversations on the chatbot application transferred from the chatbot to the customer support agent and labeled with the outcome;

converting, by the one or more processors, the outcome to a reward; and performing, by the one or more processors, a random dropout on the real-time conversation on the chatbot application in order to change a history of the real-time conversation on the chatbot application and randomize the real-time conversation on the chatbot application before the user is transferred to the customer support agent.

11. The computer-implemented method of claim 10, wherein if the outcome is positive, the reward is either 10 for suggesting a transfer to the customer support agent; 1 if the next intention appears in the real-time conversation on the chatbot application; or 0.

12. The computer-implemented method of claim 10, wherein if the outcome is negative, the reward is −10 for suggesting transfer to the customer support agent; 1 if the next intention appears in the real-time conversation; or 0.

13. A computer program product comprising:
one or more computer readable storage media and program instructions stored on the one or more computer readable storage media, the program instructions comprising:
responsive to a user inputting a query into a real-time conversation on a chatbot application through a user interface of a user computing device, program instructions to classify the query as an intention of the user utilizing an intent classifier and predictor engine;
program instructions to predict a set of next intentions of the user utilizing the intent classifier and predictor engine, wherein the set of next intentions of the user are predicted based on a pattern recognized, in a plurality of queries previously received, by the intent classifier and predictor engine;
program instructions to train a question suggestion engine to filter out one or more intentions from the set of next intentions of the user that do not further the real-time conversation on the chatbot application, wherein a subset of next intentions remaining provide a basis for the question suggestion engine to generate a set of suggested queries that the user can ask to further the real-time conversation on the chatbot application;
program instructions to generate the set of suggested queries using the question suggestion engine;
program instructions to build a suggestion evaluation contextual bandit model that determines whether the real-time conversation on the chatbot application will be resolved successfully if transferred to a customer support agent;
program instructions to train the suggestion evaluation contextual bandit model against a set of annotated historical interactions to evaluate a response by a chatbot to the query based on an outcome of the set of historical interactions; and
program instructions to output a response recommendation into the real-time conversation on the chatbot application through the user interface of the user computing device, wherein the response recommendation includes the set of suggested queries.

14. The computer program product of claim 13, further comprising:
program instructions to prepare the set of data for the suggestion evaluation contextual bandit model by:
program instructions to gather a plurality of historical transcripts of one or more real-time conversations on the chatbot application that were transferred from the chatbot to the customer support agent from a database;
program instructions to allocate one or more intentions from the set of next intentions to one or more buyer stages of the real-time conversation on the chatbot application; and
program instructions to annotate the plurality of historical transcripts of the one or more real-time conversations on the chatbot application that were transferred from the chatbot to the customer support agent as a success or as a failure.

15. The computer program product of claim 13, wherein building the suggestion evaluation bandit model further comprises:
program instructions to define a plurality of states to be used to simplify the real-time conversation on the chatbot application into a small tractable number of states;
program instructions to enable the customer support agent to select an action regarding one or more options to present to the user in the real-time conversation on the chatbot application from a set of actions; and
program instructions to define a plurality of rewards based on what the user has previously done.

16. The computer program product of claim 13, wherein training the suggestion evaluation bandit model against the set of annotated historical interactions to evaluate the response to the query based on the outcome of the set of historical interactions further comprises:
program instruction to gather one or more real-time conversations on the chatbot application transferred from the chatbot to the customer support agent and labeled with the outcome;
program instructions to convert the outcome to a reward; and
program instructions to perform a random dropout on the real-time conversation on the chatbot application in order to change a history of the real-time conversation on the chatbot application and randomize the real-time conversation on the chatbot application before the user is transferred to the customer support agent.

17. A computer system comprising:
one or more computer processors;
one or more computer readable storage media;
program instructions collectively stored on the one or more computer readable storage media for execution by at least one of the one or more computer processors, the stored program instructions comprising:
responsive to a user inputting a query into a real-time conversation on a chatbot application through a user interface of a user computing device, program instructions to classify the query as an intention of the user utilizing an intent classifier and predictor engine;
program instructions to predict a set of next intentions of the user utilizing the intent classifier and predictor engine, wherein the set of next intentions of the user are predicted based on a pattern recognized, in a plurality of queries previously received, by the intent classifier and predictor engine;
program instructions to train a question suggestion engine to filter out one or more intentions from the set of next intentions of the user that do not further the real-time conversation on the chatbot application, wherein a subset of next intentions remaining provide a basis for the question suggestion engine to generate a set of suggested queries that the user can ask to further the real-time conversation on the chatbot application;

program instructions to generate the set of suggested queries using the question suggestion engine;

program instructions to build a suggestion evaluation contextual bandit model that determines whether the real-time conversation on the chatbot application will be resolved successfully if transferred to a customer support agent;

program instructions to train the suggestion evaluation contextual bandit model against a set of annotated historical interactions to evaluate a response by a chatbot to the query based on an outcome of the set of historical interactions; and program instructions to output a response recommendation into the real-time conversation on the chatbot application through the user interface of the user computing device, wherein the response recommendation includes the set of suggested queries.

18. The computer system of claim 17, further comprising:

program instructions to prepare the set of data for the suggestion evaluation contextual bandit model by:

program instructions to gather a plurality of historical transcripts of one or more real-time conversations on the chatbot application that were transferred from the chatbot to the customer support agent from a database;

program instructions to allocate one or more intentions from the set of next intentions to one or more buyer stages of the real-time conversation on the chatbot application; and program instructions to annotate the plurality of historical transcripts of the one or more real-time conversations on the chatbot application that were transferred from the chatbot to the customer support agent as a success or as a failure.

19. The computer system of claim 17, wherein building the suggestion evaluation bandit model further comprises:

program instructions to define a plurality of states to be used to simplify the real-time conversation on the chatbot application into a small tractable number of states;

program instructions to enable the customer support agent to select an action regarding one or more options to present to the user in the real-time conversation on the chatbot application from a set of actions; and program instructions to define a plurality of rewards based on what the user has previously done.

20. The computer system of claim 17, wherein training the suggestion evaluation bandit model against the set of annotated historical interactions to evaluate the response to the query based on the outcome of the set of historical interactions further comprises:

program instruction to gather one or more real-time conversations on the chatbot application transferred from the chatbot to the customer support agent and labeled with the outcome;

program instructions to convert the outcome to a reward; and program instructions to perform a random dropout on the real-time conversation on the chatbot application in order to change a history of the real-time conversation on the chatbot application and randomize the real-time conversation on the chatbot application before the user is transferred to the customer support agent.

\* \* \* \* \*